(12) United States Patent
Abali et al.

(10) Patent No.: US 9,785,348 B2
(45) Date of Patent: Oct. 10, 2017

(54) BALANCING USAGE OF REAL AND VIRTUAL SPACE TO AVOID OUT-OF-SPACE CONDITIONS IN STORAGE CONTROLLERS

(71) Applicant: International Business Machines Corporation, Armonk, NY (US)

(72) Inventors: Bulent Abali, Tenafly, NJ (US); David D. Chambliss, Morgan Hill, CA (US); Joseph S. Glider, Palo Alto, CA (US); Luis A. Lastras-Montano, Cortlandt Manor, NY (US); Cameron J. McAllister, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 140 days.

(21) Appl. No.: 14/288,689

(22) Filed: May 28, 2014

(65) Prior Publication Data

US 2015/0347024 A1    Dec. 3, 2015

(51) Int. Cl.
*G06F 13/00* (2006.01)
*G06F 3/06* (2006.01)
*G06F 12/02* (2006.01)

(52) U.S. Cl.
CPC .......... *G06F 3/0608* (2013.01); *G06F 3/0631* (2013.01); *G06F 3/0665* (2013.01); *G06F 3/0673* (2013.01); *G06F 12/023* (2013.01)

(58) Field of Classification Search
CPC .... G06F 3/0608; G06F 3/0665; G06F 3/0653; G06F 3/0673; G06F 3/0631; G06F 12/023; G06F 2206/1012

USPC .......... 711/170, 6; 707/693; 710/68
See application file for complete search history.

(56) References Cited

U.S. PATENT DOCUMENTS

| | | | |
|---|---|---|---|
| 7,130,960 B1 | 10/2006 | Kano | |
| 8,219,777 B2 | 7/2012 | Jacobson et al. | |
| 8,504,524 B1 | 8/2013 | Chatterjee et al. | |
| 2011/0060885 A1* | 3/2011 | Satoyama | G06F 3/0605 711/170 |
| 2011/0185139 A1* | 7/2011 | Inoue | G06F 3/0605 711/165 |
| 2011/0225360 A1 | 9/2011 | Baptist et al. | |
| 2012/0054306 A1 | 3/2012 | Vaghani et al. | |
| 2012/0131303 A1 | 5/2012 | Goebel et al. | |
| 2013/0007360 A1* | 1/2013 | Shiga | G06F 3/0608 711/112 |
| 2014/0143517 A1* | 5/2014 | Jin | G06F 3/0608 711/171 |
| 2014/0208329 A1* | 7/2014 | Abali | G06F 9/4856 718/104 |
| 2015/0161011 A1* | 6/2015 | Chambliss | G06F 12/16 714/6.23 |

(Continued)

*Primary Examiner* — Hong Kim
(74) *Attorney, Agent, or Firm* — Lieberman & Brandsdorfer, LLC

(57) ABSTRACT

Embodiments of the invention relates to avoiding out-of-space conditions in storage controllers operating with efficiency capabilities between virtual space in a data container and real space in a storage container. Both the real space and the virtual space are monitored and their respective usage is compared to provide information about occupancy of the real space to the virtual space. Usage of the containers is balanced by employing a virtual file associated with a reserved portion of free capacity in the virtual space.

18 Claims, 4 Drawing Sheets

(56) References Cited

U.S. PATENT DOCUMENTS

2015/0331704 A1* 11/2015 Abali ................ G06F 9/455
718/1

* cited by examiner

BALANCING USAGE OF REAL AND VIRTUAL SPACE TO AVOID OUT-OF-SPACE CONDITIONS IN STORAGE CONTROLLERS

BACKGROUND

The present invention pertains to the relationship between virtual capacity in a data container holding data objects stored by a storage application, and real capacity of a storage container supporting the capacity of the virtual data container. More specifically, the invention relates to providing a view of usage of real space in the storage container as reflected in usage of virtual space in a corresponding data container, and avoiding the consequences of running out of real space caused by an incorrectly perceived availability of virtual space.

Storage controllers that support thin-provisioning and compression offer storage efficiency capabilities. In one embodiment, the data container is a file system instance, and a data object is a file in the file system instance. Similarly, in one embodiment, the storage application is file system software. A common aspect of the storage efficiency capabilities is that a storage application that stores data in a data container is offered a limited amount of virtual capacity, and the real capacity backing the virtual capacity is smaller. For example, a one terabyte data container might be limited to 500 gigabytes of real capacity. In one embodiment, real capacity is a set of hard disks. To support the relationship between the virtual capacity and the real capacity, the storage controller may in one embodiment employ compression for stored data, or in another embodiment, the storage controller may limit allocation of storage blocks for data that is actually written by the storage application.

Thin-provisioning storage controllers are known for presenting a larger virtual capacity than that which is supported by real capacity. The storage application may operate as if the large virtual capacity exists, but when the real space in the storage container nears capacity, data access may be interrupted if the storage application continues to write data to the data container. At the same time, storage efficiencies, such as thin provisioning, enable the storage controller to provide capacity at lower cost. However, an entity such as a storage administrator must predict how much real space will be used, and use the prediction to establish a ratio of virtual space in the data container to real space in the storage container in configuring the real space. An inaccurate prediction may result in running out of real space while the storage application is unaware that insufficient real space exists.

BRIEF SUMMARY

The invention comprises a method, computer program product, and system for managing capacity overflow conditions in storage controllers through application of a virtual space filling data object.

A method, computer program product, and system are provided for importing knowledge of an associated storage container and data container to an agent. Virtual space in a data container allocated by a storage application is monitored. Similarly, real space allocated in the associated storage container is monitored. The real space holds data written by the storage application. Usage of the virtual space is compared to usage of the real space. An agent is employed to balance usage of space in the data container with real space usage in the storage container, the act of balancing including the agent adjusting an amount of a reserved portion of free capacity in the virtual space.

Other features and advantages of this invention will become apparent from the following detailed description of the presently preferred embodiment(s) of the invention, taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments of the invention, and not of all embodiments of the invention unless otherwise explicitly indicated.

DETAILED DESCRIPTION

Figure 1:
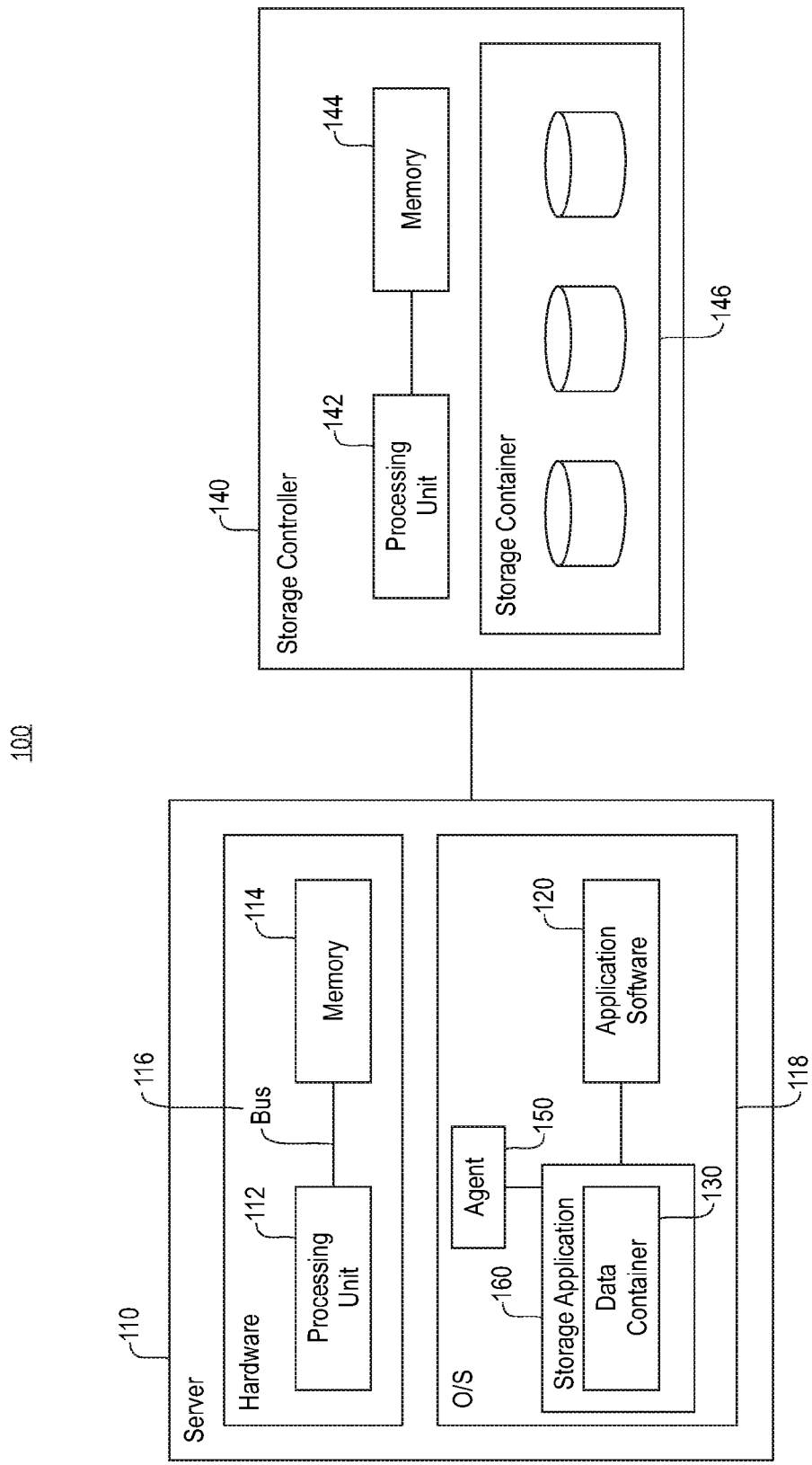
FIG. 1 depicts a block diagram illustrating tools embedded in a computer system to support monitoring virtual and real space used, and allocating and de-allocating data container space controlled by a storage application.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Reference is made to real space and a storage container, and virtual space and a data container. Real space and the storage container refer to actual, physical storage capacity of a nonvolatile storage system, such as a hard disk drive or a pool of hard disk drives. Virtual space and the data container refer to an addressable space in which a storage application may operate. Capacity of the data container may not directly correspond to the capacity of the storage container. An agent is provided to balance the reported available space between the storage container and the data container.

The functionality of the agent monitors capacity of both the data container and the storage container, and through its operation supports the storage application's ability to create, write, truncate, and delete data objects without disruption. More specifically, the agent creates a data object to occupy virtual space in the data container so that an appropriate amount of virtual space is consumed while consuming little or no real space, and adjusts the size of the data object over time to cause the amount of real capacity available in the storage container to be reflected in the amount of virtual capacity available in the data container. As used virtual space reaches full capacity due to the size adjustment of the agent-controlled data object, the storage application that stores data in a data container is inhibited from allocating more space for other data objects. To create more space in the associated storage container, more real storage capacity may be added, or if possible, data objects may be migrated to another storage container, or real space still allocated to deleted data objects may be freed. Accordingly, the agent functions to bring the knowledge of the new available space state of the storage container to the data container.

FIG. 1 is a block diagram (100) illustrating tools embedded in a computer system to support monitoring of virtual and real space used, and allocating and de-allocating data container space in a storage application. There are five primary components shown herein, including an application server (110), a storage application (160), a data container (130), a storage controller (140), a storage container (146) and a monitoring agent (150).

The application server (110) is provided with a processing unit (112) operatively coupled to memory (114) across a bus (116). The application server is shown with an operating system (118) in communication with application software (120) and computer hardware, e.g. the processing unit (112) and memory (114). The application software (120), also referred to herein as a user application, reads and writes data to the data container (130), via requests to the storage application (160). The storage controller (140) is in communication with the storage application (160). As shown, the storage controller (140) includes a processing unit (142) in communication with memory (144) and is embodied with a storage container (146). In one embodiment, the storage container (146) includes multiple physical storage devices. In one embodiment, the storage controller (140) is in local communication with the application server (110) and functions to store data generated by application software (120) operating in the application server (110). In one embodiment, the storage controller (140) may be in remote communication with the application server (110), and may also be in communication with one or more additional storage containers in a shared pool of resources. Regardless of the local or remote communication between the application server (110) and the storage controller (140), the data container (130) reflects the virtual capacity and the storage container (146) reflects the real capacity.

The monitoring agent (150), also referred to herein as the agent, is in communication with both the data container (130) and the storage container (146). The agent (150) may be in the form of an application, or in one embodiment an independent process in the operating system (118). The agent (150) functions to learn from the data container (130) how much of its virtual space is available, and to learn from the associated storage container (146) how much real space is available The agent (150) monitors virtual space allocated in the data container (130) and monitors real space allocated in the storage container (146).

In addition to the monitoring function, the agent (150) compares usage of the virtual space to usage of the real space. The agent (150) functions to provide a balance between the spaces. In one mode, the agent (150) operates in a passive mode in which it reserves a portion of free capacity in the virtual space. The agent (150) adjusts the size of this reserved portion in order to bring balance to the real and virtual spaces. The adjustment set forth by the agent (150) includes expanding the size of the reserved virtual space when the available real space in the storage container is below a threshold. In one embodiment, the agent (150) operates in a continuous mode to monitor available capacity in the real space. The continuous mode of operation includes reducing the size of the reserved virtual space when the available real space in the associated storage container is greater than a threshold. As noted above, in one embodiment, the virtual space reservation is accomplished via a data object created or embedded in the data container (130).

In another mode, the agent (150) operates in an aggressive mode in which the agent reacts to usage of the real space in the storage container (146) exceeding a capacity utilization threshold. Once this threshold is attained, the agent (150) inhibits writing of new data in the real space by increasing the size of the reserved virtual space such that there is very little or no virtual space available. With respect to both the passive mode and the aggressive mode, the function of the agent (150) is to enable the storage application to maintain full operability while occupancy in the storage container (146) is balanced with the data container (130).

As identified above, the agent (150) is shown residing local to the application server (110). In one embodiment, the agent (150) may reside as an application in memory (114) or as a hardware tool or an application external to the memory (114). In another embodiment, the agent (150) may be implemented as a combination of hardware and software. In the case of the storage container representing a shared pool of resources, the agent (150) may be collectively or individually distributed across the shared pool of computer resources and function as a unit to support maintaining the occupancy of the storage space in alignment with the virtual space. Accordingly, agent (150) may be implemented as a software tool, hardware tool, or a combination of software and hardware.

Figure 2:
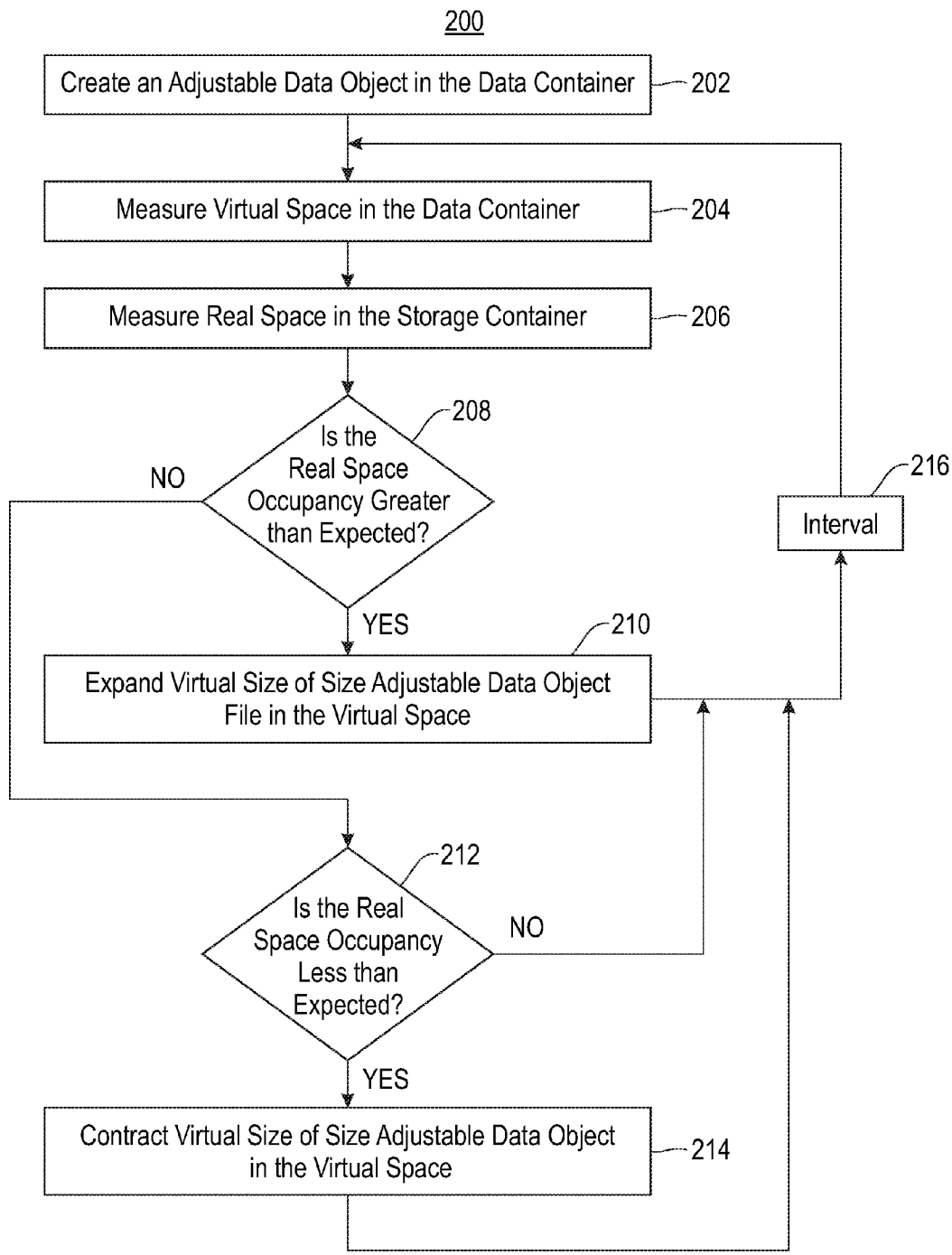
FIG. 2 depicts a flow chart illustrating one aspect of the agent consuming space in the data container in a periodic adjustment mode.

To further illustrate and as shown herein, FIG. 2 is a flow chart (200) illustrating one aspect of the agent consuming virtual space in the data container in a periodic adjustment mode. The agent periodically monitors a real capacity utilization of the storage container, compares this against the virtual capacity utilization of the data container, and adjusts the size of a virtual space filling data object in order to align virtual space used with real space used. More specifically, the agent aligns virtual capacity utilization of the data container with the real capacity utilization of the storage container. In one embodiment, the alignment includes making the percentage of used space the same in both the data and storage containers. A data object whose size can be adjusted is created in the data container (202). The size of the data object is adjustable and can be expanded or contracted. The data object is created to consume an appropriate amount of virtual space while consuming little or no real space. In one embodiment, the data object is a file that has file system data blocks allocated to it without writing data to the storage controller. In another embodiment, the data object has zeros written to all of the bytes in the data object given that for storage controllers with compression or thin provisioning capability, a zero filled file will cause minimal or no real space to be consumed. In one embodiment, the agent is configured in a Linux based system and the file allocate command, e.g. fallocate, is used to pre-allocate blocks to the file, where blocks are allocated and marked as uninitialized, requiring no I/O to the data blocks. Accordingly, the size-adjustable data object is created in the virtual space and occupies a minimal amount of space therein.

The size-adjustable data object in the virtual space balances availability of the virtual space with the real space. Virtual space in the data container is measured (204), and the real space in the storage container is measured (206). As shown, it is determined if the real space occupancy is greater than expected (208). In one embodiment, the occupancy determination may be with respect to a threshold. The determination at step (208) ascertains if the available capacity of the storage container is reflected by the available capacity in the data container. In one embodiment, the determination at step (208) ascertains if the capacity of the storage container is being consumed faster than expected. If the real space occupancy is greater than expected, the virtual size of the size-adjustable data object in the virtual space is expanded (210). Accordingly, the capacity of the real space is monitored and the size-adjustable data object is expanded in the virtual space in response to the occupancy of the real space being greater than expected.

If the determination at step (208) is negative, it is then determined if the real space occupancy is less than expected (212). This determination ascertains if the virtual size of the size-adjustable data object needs to be contracted. In the periodic adjustment mode, the data object is present in the data container, and it is adjusted in response to the monitoring of the occupancy of the storage container. If the storage container occupancy is less than expected, the virtual size of the size-adjustable data object is contracted (214). The contraction of the data object provides more space for applications to write data to the data container. At the same time, the contraction of the data object brings knowledge to the data container that there is more space available in the storage container. The continuity of the monitoring is demonstrated with an interval associated with monitoring. As shown, following the expansion of the virtual size of the file at step (210), a negative response to the determination at step (212), or following contracting the virtual size of the file at step (214), the agent pauses for a set interval (216) prior to returning to the measurements at steps (204) and (206). In one embodiment, the interval at step (216) may be adjusted. Accordingly, the virtual size of the size-adjustable data object in the data container is adjusted such that the virtual occupancy of the data container reflects occupancy in the associated storage container.

The determinations illustrated at steps (208) and (212) are an example of the assessments in the storage container that may be employed for adjustment of the virtual data object in the data container. In one embodiment, an agent is provided to monitor the occupancy of the real space. The determinations shown at step (208) and (212) exemplify how the agent may employ periodic monitoring to the occupancy of the storage container, and implement expansion or contraction of the virtual data object. Furthermore, the order of the determinations at steps (208) and (212) should not be considered limiting, and in one embodiment the order in which they are implemented may be reversed. Accordingly, the expansion and contraction of the virtual data object ensures that virtual capacity utilization of the data container generally reflects the real capacity utilization of the storage container.

As shown in FIG. 2, the agent monitors virtual space in a data container allocated by a storage application and real space allocated in a storage container. In one embodiment, the agent functions by comparing a ratio of virtual space usage to real space usage with an expected value for the ratio. The ratio reflects a balance between the containers. As noted above, when the occupancy of the storage container reaches its limit, this affects the functionality of the data container. If the ratio meets the expected value, the agent may keep the size of the data container to be the same, and if the ratio exceeds the expected value, the agent may activate or otherwise adjust the size of the virtual data object in the data container. Accordingly, the agent may operate in a comparison mode between the containers and their associated occupancy.

Figure 3:
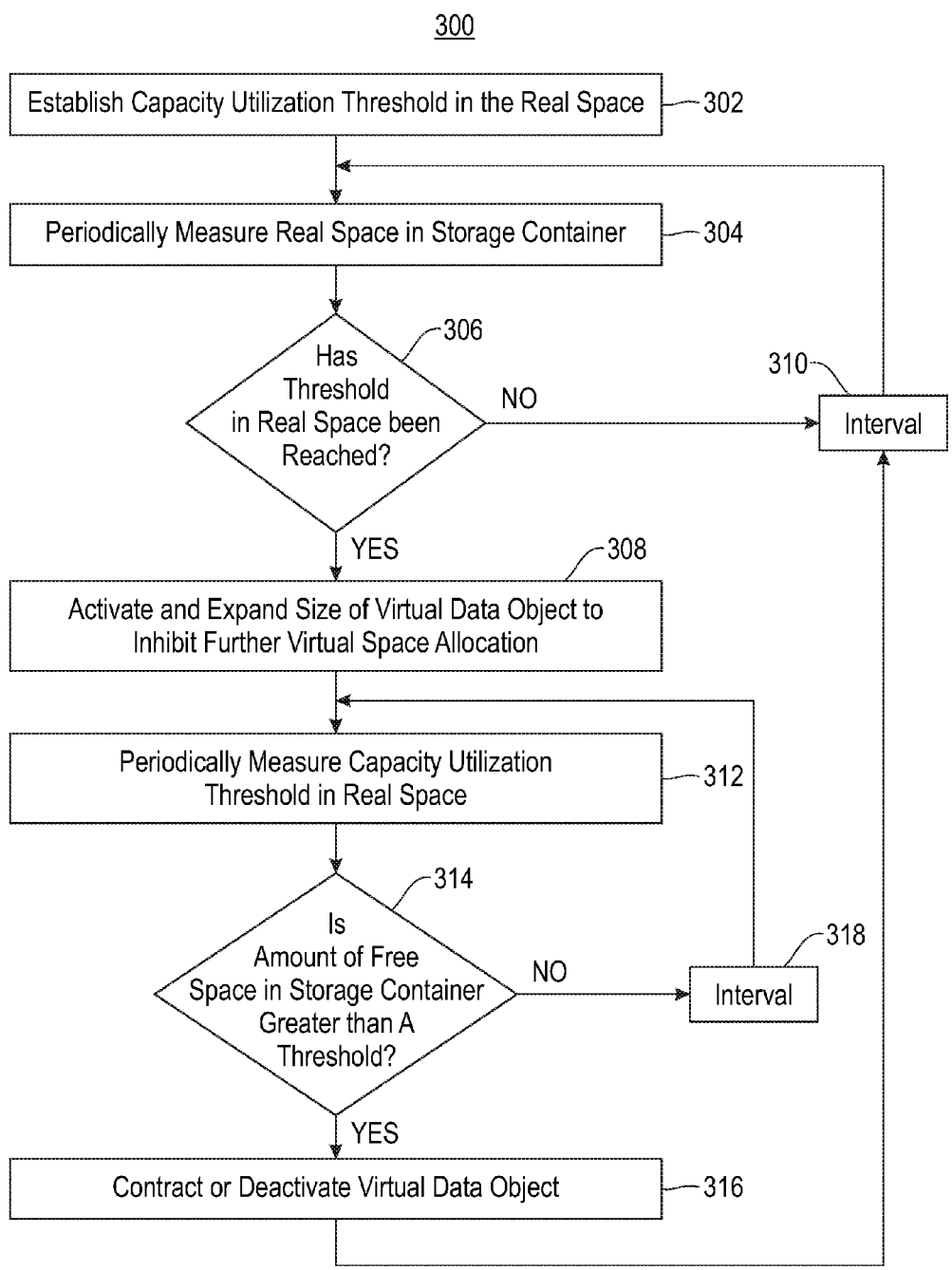
FIG. 3 depicts a flow chart illustrating an alternate function mode of the agent, also referred to herein as an emergency mode.

As shown in FIG. 2, the virtual data object is present in the data container and the size of the virtual data object is adjusted on a periodic basis to balance usage of space in the data container with usage of space in the storage container. In one embodiment, balancing of available virtual space in the data container ensures availability of real space in an associated storage container. FIG. 3 is a flow chart (300) depicting an alternate function mode of the agent, also referred to herein as an emergency mode. In this mode, the virtual data object is activated based on detection that the real space is close to attaining full capacity. As shown, a capacity utilization threshold is established in the real space (302). In one embodiment, the capacity utilization threshold reflects a maximum or near maximum quantity of consumed blocks in the real space. Real space in the storage container is periodically measured (304), and it is determined if the threshold has been reached (306). In one embodiment, the determination at step (306) ascertains if the threshold has been met or exceeded. At such time as this threshold is attained (306), the virtual data object is activated and the size of the virtual data object is expanded (308). In one embodiment, the virtual data object is always present or available in the virtual space. When expanded, the virtual file effectively reserves almost all the virtual space in the data container based upon meeting the threshold in the storage container. At the same time, the occupation of expanded virtual space by the virtual data object inhibits further allocation of virtual space in the data container, which inhibits writing of new data into the real space. If at step (306) it is determined that the threshold has not been met, then the agent pauses for a set interval (310) prior to returning to the periodic measurement at step (304). In one embodiment, the interval at step (310) may be adjusted.

Expansion of the size of the virtual data object in the virtual space at step (308) reserves virtual space to inhibit further virtual space allocation. Either during or following the expansion of the virtual file at step (308), the capacity utilization threshold in the real space of the storage container is periodically measured (312), and it is determined if the amount of free space in the storage container is great than a threshold (314). Once the free space in the storage container is greater than the threshold, the virtual data object is contracted (316) or deactivated. In one embodiment, the size of the virtual data object may be contracted to a lower percentage of free capacity once the amount of allocated real space in the storage container goes under the threshold. The monitoring of the real space in the storage container continues. As shown, following a negative response to the determination at step (314), the agent pauses for a set interval (318) prior to returning to the periodic measurement at step (312). In one embodiment, the interval at step (318) may be adjusted. Following the contraction of the file at step (316), the process returns to step (310) to pause for the set interval. Accordingly, continuity of the monitoring is demonstrated with an interval associated with monitoring.

With respect to the embodiments shown and described in both FIG. 2 and FIG. 3, some storage applications' data containers are configured to store data in multiple storage controller storage containers. In this embodiment, the virtual data object may be configured for the entire data container. Similarly, the virtual data object may be configured on a storage container basis that can individually balance the virtual space with the real space separately for each storage controller storage container. Accordingly, the virtual data object may be employed on either an individual basis or a multiple storage container basis.

The agent is employed to manage the virtual data object. There are two modes of operation for the data object, one mode operating on a periodic basis, FIG. 2, and another mode operating on an emergency basis, FIG. 3. These two modes are not mutually exclusive. Regardless of the mode or combination of modes, the use of the virtual data object brings knowledge to the storage application of how much space is available in the storage container. Without the virtual data object and the expansion and contraction thereof, knowledge of the data container and available space is limited to the virtual space. Expansion of the data object brings knowledge to the data container about space limitations in the storage container. Conversely, contraction of the virtual data object brings knowledge to the data container about space availability in the storage container. Accordingly, by activating the virtual data object for expansion or contraction, knowledge about space availability or space restrictions is made available to the storage application by adjusting the apparent amount of virtual space available in the data container.

The server described above in FIG. 1 has been labeled with a tool in the form of an agent. The tool may be implemented in programmable hardware devices such as field programmable gate arrays, programmable array logic, programmable logic devices, or the like. The tool may also be implemented in software for execution by various types of processors. An identified functional unit of executable code may, for instance, comprise one or more physical or logical blocks of computer instructions which may, for instance, be organized as an object, procedure, function, or other construct. Nevertheless, the executable of the tool need not be physically located together, but may comprise disparate instructions stored in different locations which, when joined logically together, comprise the tool and achieve the stated purpose of the tool.

Indeed, executable code could be a single instruction, or many instructions, and may even be distributed over several different code segments, among different applications, and across several memory devices. Similarly, operational data may be identified and illustrated herein within the tool, and may be embodied in any suitable form and organized within any suitable type of data structure. The operational data may be collected as a single data set, or may be distributed over different locations including over different storage devices, and may exist, at least partially, as electronic signals on a system or network.

Furthermore, the described features, structures, or characteristics may be combined in any suitable manner in one or more embodiments. In the following description, numerous specific details are provided, such as examples of agents, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Figure 4:
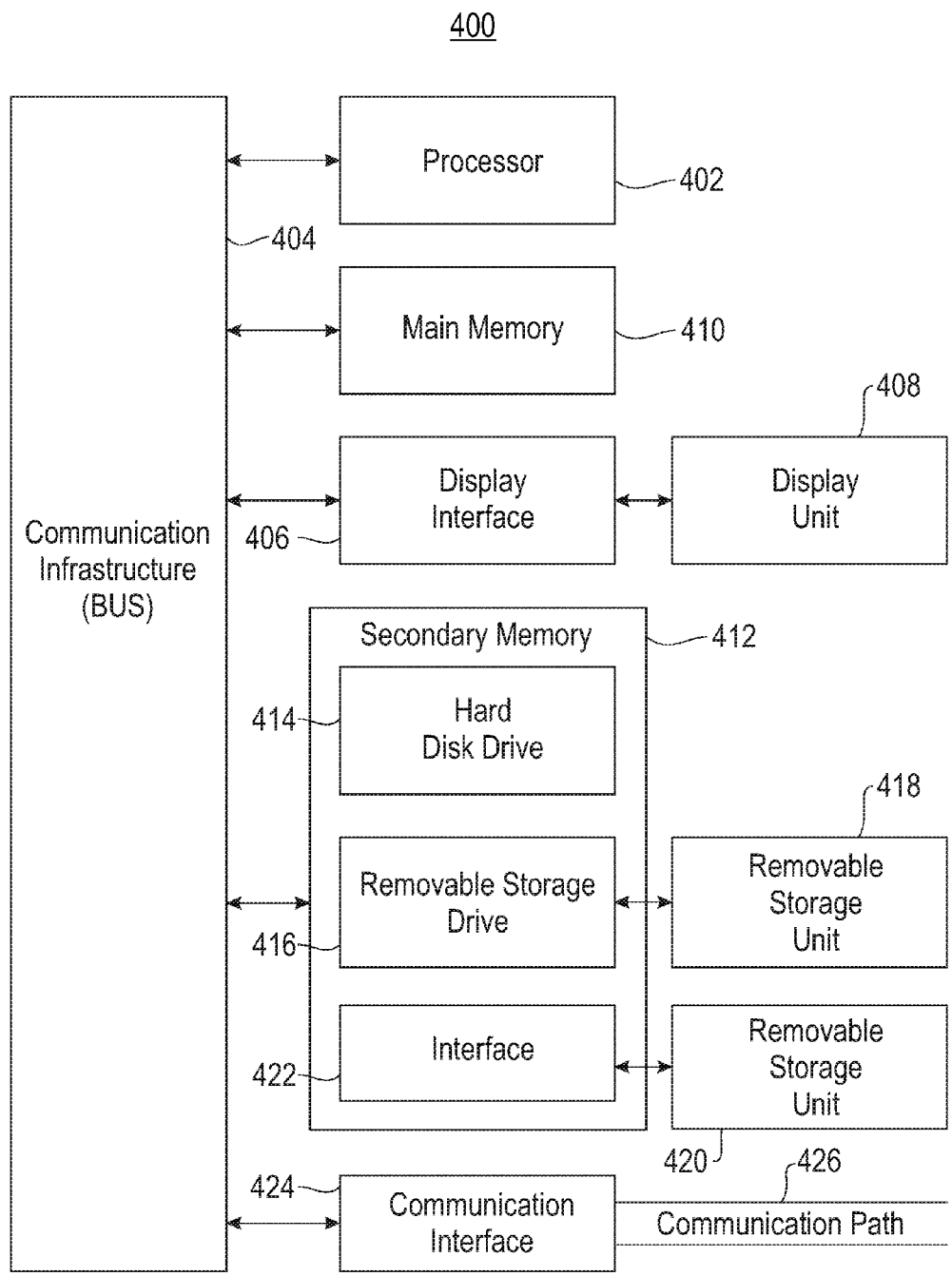
FIG. 4 depicts a block diagram of a computing environment according to an embodiment of the present invention.

Referring now to the block diagram of FIG. 4, additional details are now described with respect to implementing an embodiment of the present invention. The computer system includes one or more processors, such as a processor (402). The processor (402) is connected to a communication infrastructure (404) (e.g., a communications bus, cross-over bar, or network).

The computer system can include a display interface (406) that forwards graphics, text, and other data from the communication infrastructure (404) (or from a frame buffer not shown) for display on a display unit (408). The computer system also includes a main memory (410), preferably random access memory (RAM), and may also include a secondary memory (412). The secondary memory (412) may include, for example, a hard disk drive (414) and/or a removable storage drive (416), representing, for example, a floppy disk drive, a magnetic tape drive, or an optical disk drive. The removable storage drive (416) reads from and/or writes to a removable storage unit (418) in a manner well known to those having ordinary skill in the art. Removable storage unit (418) represents, for example, a floppy disk, a compact disc, a magnetic tape, or an optical disk, etc., which is read by and written to by removable storage drive (416). As will be appreciated, the removable storage unit (418) includes a computer readable medium having stored therein computer software and/or data.

In alternative embodiments, the secondary memory (412) may include other similar means for allowing computer programs or other instructions to be loaded into the computer system. Such means may include, for example, a removable storage unit (420) and an interface (422). Examples of such means may include a program package and package interface (such as that found in video game devices), a removable memory chip (such as an EPROM, or PROM) and associated socket, and other removable storage units (420) and interfaces (422) which allow software and data to be transferred from the removable storage unit (420) to the computer system.

The computer system may also include a communications interface (424). Communications interface (424) allows software and data to be transferred between the computer system and external devices. Examples of communications interface (424) may include a modem, a network interface (such as an Ethernet card), a communications port, or a PCMCIA slot and card, etc. Software and data transferred via communications interface (424) is in the form of signals which may be, for example, electronic, electromagnetic, optical, or other signals capable of being received by communications interface (424). These signals are provided to communications interface (424) via a communications path (i.e., channel) (426). This communications path (426) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (410) and secondary memory (412), removable storage drive (416), and a hard disk installed in hard disk drive (414).

Computer programs (also called computer control logic) are stored in main memory (410) and/or secondary memory (412). Computer programs may also be received via a communication interface (424). Such computer programs, when run, enable the computer system to perform the features of the present invention as discussed herein. In particular, the computer programs, when run, enable the processor (402) to perform the features of the computer system. Accordingly, such computer programs represent controllers of the computer system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, the code stream compression supports flexibility with respect to decompression, including, decompression of the code stream from an arbitrary position therein, with the decompression being a recursive process to the underlying literal of a referenced phrase.

Alternative Embodiment

It will be appreciated that, although specific embodiments of the invention have been described herein for purposes of illustration, various modifications may be made without departing from the spirit and scope of the invention. In particular, a capability may be introduced in the storage application to coordinate with the agent monitoring occupancy in the storage container to have virtual space filling data objects per storage container that can individually balance the virtual with the real sizes separately for each storage controller storage container. Accordingly, the scope of protection of this invention is limited only by the following claims and their equivalents.

We claim:

1. A method comprising:
monitoring virtual space in a data container having a size-adjustable object present in the virtual space;
monitoring real space allocated in a storage container having data;
comparing virtual space usage in the data container to real space usage in the storage container, including identifying of any misalignment; and
responsive to presence of the misalignment, adjusting a virtual size of the object in the virtual space, including aligning virtual capacity of the data container with real capacity of the storage container.

2. The method of claim 1, wherein adjusting the virtual size of the object includes expanding the virtual size when available real space in the storage container is below a threshold.

3. The method of claim 2, wherein adjusting the virtual size of the object includes continuously maintaining availability of real space, including reducing the virtual size when an available amount of real space in the storage container is greater than the threshold.

4. The method of claim 1, wherein the object is an active file created in a file system.

5. The method of claim 4, wherein adjusting the virtual size of the object includes writing a compressible file to the storage container.

6. The method of claim 1, further comprising, in response to usage of the storage container exceeding a capacity utilization threshold, increasing the virtual size of the object, wherein the increased virtual size inhibits writing of new data into the virtual space.

7. The method of claim 1, further comprising freeing real space in the storage container, the freed real space associated with previously deleted files in the data container.

8. A computer program product for managing storage capacity, the computer program product comprising a non-transitory computer readable storage medium having program code embodied therewith, the program code executable by a processor to:
monitor virtual space in a data container allocated by a storage application, the data container having a size-adjustable object present in the virtual space;
monitor real space allocated in a storage container, the real space having data;
compare virtual space usage in the data container to real space usage in the storage container, including identification of any misalignment; and
responsive to presence of the misalignment, adjust the size of the object in the virtual space, including align virtual capacity of the container with real capacity of the storage container.

9. The computer program product of claim 8, wherein adjusting the virtual size of the object includes program code to expand the virtual size when available real space in the storage container is below a threshold.

10. The computer program product of claim 9, wherein adjusting the virtual size of the object includes program code to continuously maintain availability of real space, including program code to reduce the virtual size when an available amount of real space in the storage container is greater than a threshold.

11. The computer program product of claim 8, wherein the object is an active file created in a file system.

12. The computer program product of claim 11, wherein adjusting the virtual size of the object includes program code to write a compressible file to a storage container.

13. The computer program product of claim 8, further comprising program code to increase the virtual size of the object in response to usage of the storage container exceeding a capacity utilization threshold, wherein the increased virtual size of the object inhibits writing of new data into the virtual space.

14. The computer program product of claim 8, further comprising program code to cause the storage container to free real space associated with previously deleted files in the data container.

15. A method comprising:
monitoring virtual space in a data container having a size-adjustable object present in the virtual space;
monitoring real space allocated in a storage container having data;
a balancing agent comparing a ratio of virtual space usage in the data container to real space usage in the storage container to an expected value, wherein the expected value permits a normal mode of operation to the data container; and
responsive to the ratio exceeding an expected value the balancing agent adjusting a virtual size of the object, including aligning virtual capacity of the data container with real capacity of the storage container.

16. The method of claim 15, further comprising the balancing agent causing the storage container to free real space associated with previously deleted files in the data container.

17. The method of claim 15, wherein adjusting the size of the object includes the balancing agent writing a compressible file to a storage container.

18. The method of claim 15, wherein adjusting the virtual size of the object is an action selected from the group consisting of: expanding the virtual size of the object and contracting the virtual size of the object.

* * * * *